US008228298B2

(12) United States Patent
Benali-Khoudja et al.

(10) Patent No.: US 8,228,298 B2
(45) Date of Patent: Jul. 24, 2012

(54) METHOD AND DEVICES OF TRANSMITTING TACTILE INFORMATION DESCRIPTION

(75) Inventors: Mohamed Benali-Khoudja, Grenoble (FR); Moustapha Hafez, Paris (FR)

(73) Assignee: Commissariat a l'Energie Atomique, Paris (FR)

( * ) Notice: Subject to any disclaimer, the term of this patent is extended or adjusted under 35 U.S.C. 154(b) by 1276 days.

(21) Appl. No.: 11/885,065

(22) PCT Filed: Feb. 28, 2006

(86) PCT No.: PCT/FR2006/050178
§ 371 (c)(1),
(2), (4) Date: Aug. 24, 2007

(87) PCT Pub. No.: WO2006/092531
PCT Pub. Date: Sep. 8, 2006

(65) Prior Publication Data
US 2008/0246737 A1    Oct. 9, 2008

(30) Foreign Application Priority Data
Mar. 1, 2005    (FR) ...................................... 05 50539

(51) Int. Cl.
| G06F 3/041 | (2006.01) |
| G06F 17/00 | (2006.01) |
| G06F 19/00 | (2011.01) |
| G06F 3/01 | (2006.01) |
| A63F 9/24 | (2006.01) |
| A63F 13/00 | (2006.01) |
| G09B 21/00 | (2006.01) |
| H04M 11/00 | (2006.01) |

(52) U.S. Cl. .......... 345/173; 463/30; 434/113; 434/114; 715/702; 340/4.12; 379/52

(58) Field of Classification Search .......... 345/173–178; 463/30; 434/112–114; 715/701–702; 340/4.12; 379/52
See application file for complete search history.

(56) References Cited

U.S. PATENT DOCUMENTS
6,278,441 B1 *    8/2001    Gouzman et al. ............. 345/163
(Continued)

FOREIGN PATENT DOCUMENTS
WO    2004055754 A1    7/2004

OTHER PUBLICATIONS
Eves et al., "Animated Tactile Sensations in Sensory Substitution Systems," ECDVRAT, 1996, pp. 193-199, XP002357663.
(Continued)

Primary Examiner — Sumati Lefkowitz
Assistant Examiner — Jonathan Horner
(74) Attorney, Agent, or Firm — Nixon Peabody LLP

(57) ABSTRACT

Method of transmitting tactile information to a tactile display with a touch plate containing pads, the touch plate being controlled by a server, in which,
(a) tactile information is defined as being a sequence of a predefined number of images together forming a pattern, each image having a rank in the pattern, each pattern being defined by:
a design of successive images
a duration for each image,
a duration between consecutive images,
a duration between consecutive patterns;
(b) said word is transmitted to a tactile display server, preceded by a beacon indicating that data following the beacon must be directed to the touch plate control server;
(c) a series of instructions is activated when the server receives the word, this series having a start address that depends on said word, said series of instructions being used to display the successive images together forming the pattern corresponding to the word to be displayed, said series of instructions being repeated to display the same pattern a predefined number of times or for a predetermined duration.

17 Claims, 7 Drawing Sheets

U.S. PATENT DOCUMENTS 7,339,578 B2     3/2008   Hafez et al.
2002/0021277 A1* 2/2002   Kramer et al. ................ 345/156

OTHER PUBLICATIONS

Rotard et al., "Tactile Access to Scalable Vector Graphics for People with Visual Impairment," SVGOPEN.ORG, [Online], Dec. 8, 2004, XP002357664. Retrieved from the Internet: URL : http://www.svgopen.org/2004/papers/TactileAccessToSVG/>.

Brewster et al., "Tactons : Structured Tactile Messages for Non-Visual Information Display," ACM International Conference Proceeding Series, [Online] 2004, vol. 53, pp. 15-23, XP002357665, Dunedin, NZ. Retrieved from the Internet: URL: http://portal.acm.org/citation.cfm?id=976313>.

Van Erp et al., "Vibro-Tactile Information Presentation in Automobiles," EUROHAPTICS 2001, [Online] 2001, XP002357666. Retrieved from the Internet: URL: http://www.eurohaptics.vision.ee.ethz.ch/2001.shtml>.

"Human Factors (HF); Guidelines on the Multimodality of Icons, Symbols and Pictograms," ETSI EG 202 048, V1.1.1, [Online] Aug. 2002, XP002357667. Retrieved from the Internet: URL: http://webapp.etsi.org/action%5CPU/20020903/eg_202048v010101p.pdf>.

* cited by examiner

METHOD AND DEVICES OF TRANSMITTING TACTILE INFORMATION DESCRIPTION

CROSS REFERENCE TO RELATED APPLICATIONS OR PRIORITY CLAIM

This application is a national phase of International Application No. PCT/FR2006/050178 entitled "Method And Devices For Transmitting Tactile Data", which was filed on Feb. 28, 2006, which was not published in English, and which claims priority of the French Patent Application No. 05 50539 filed Mar. 1, 2005.

TECHNICAL FIELD

The invention relates to a method of transmitting tactile information between a tactile emitter and receiver. It also relates to devices integrating a tactile display and implementing the method of transmitting tactile information, for example such as a telephone, a computer device, or a vehicle steering wheel.

STATE OF PRIOR ART

There are various types of tactile displays. French patent application No. 02 15527 deposited on Sep. 12, 2002 corresponding to patent application WO, PCT FR 03 50152 deposited on Mar. 12, 2003 discloses a tactile display including a touch plate with a touch area, a network of magnetic coils activating mobile parts that modify the tactile feel as a function of currents passing through said coils to produce a tactile sensation on the touch area that depends on the different currents circulating in each of said coils, an addressing circuit to selectively address currents in the different coils, in which the touch plate includes a monolithic network of elements to modify the tactile feel, each element in the network including all mobile parts, each mobile part possibly moving under the action of a magnetic field, each set of mobile parts of a network element being subject to the field produced by one or several coils in the network, the network of magnetic coils is in the form of a monolithic layer, an insulating intermediate layer is arranged between the monolithic layer of coils and the touch plate, this insulating intermediate layer comprising a recess facing each of the elements that modify the tactile feel, providing a mobility space for said set of mobile parts of this element.

The elements that modify the tactile feel will be called pads in the remainder of the presentation.

A tactile display may have two functions; it may be designed either to make use of tactile sensitivity to transmit information (this is the case for a portable telephone vibrator) or to transmit contact information such as the local shape, roughness, texture, thermal and chemical exchanges, etc. In virtual reality or remote presence applications, an attempt is made to restore "raw" tactile perceptions, while for handicapped persons or normal telecommunication, an attempt is usually made to transmit tactile information. These displays apply low deformation or low pressure vibrations and pressures on the skin. They excite mechanical receptors present on the epidermis of the skin, capable of converting the static or dynamic indentations measured on the surface of the skin to a nerve influx.

These devices were initially developed for applications dedicated to the blind and to reading Braille, but they are now used increasingly frequently for man-machine interfaces to improve the realism of virtual representations and improve interaction between man and the machine.

PRESENTATION OF THE INVENTION

In tactile transmission methods according to prior art, each configuration of tactile pads corresponds to an item of information. Thus, for example it is possible to transmit a sequence of information, for example letters of the Braille alphabet, so that a blind person can read text. In this type of information transmission, each configuration has a specific meaning, even if reading implies successive transmission of the different letters.

The invention proposes a new method of transmitting tactile information in which the meaning of the message is not carried by a given configuration of the tactile pads on the touch plate, but rather by a sequence of configurations, each particular configuration in the sequence having no particular meaning. The message acquires its meaning not only by the nature of the different tactile displays that follow each other, but also by the rate at which they follow each other. Thus for example, the same sequence of tactile display patterns may have a different meaning depending on whether the transmission rate of this sequence is fast or slow.

The first step to achieve this objective is to define a structured tactile communication language according to the invention. Since the meaning of transmitted information does not become clear except with time, the inventors preferred to transmit information that will create an emotional state in the user of the tactile display who receives the message. The advantage of this type of information is that it requires no or very little learning by users. This characteristic is due to the fact that the inventors have experimented on a sample of persons and have shown that the proposed rates actually created the required impression. Personalisation is easy if necessary to adapt it to the particularly experience of a person.

This language can also be used in communication; according to the invention, a definition of an exchange protocol is associated with this language so that it can be used through a network, for example the Internet or a network on which a real time protocol is defined. The invention achieves this by defining beacons. The defined beacon structure can associate and synchronise this tactile language with other communication media (text, sounds, etc.).

The language proposed herein can be upgraded. A beginning of a vocabulary, in other words a set of tactile patterns, is suggested. The user can extend or modify this vocabulary as described above.

The language proposed herein is independent of whether or not the tactile display used is remote. A control server for the tactile display is associated with this language. This server may be a remote server. In this case, the tactile information is transmitted through a network. The server can also be located on a terminal containing the tactile display. The server used may be remote or included in the terminal being used, and will translate identified words of the vocabulary into a sequence of tactile images to be displayed on the tactile display.

To achieve all these purposes, the invention relates to a method of transmitting tactile information to a touch plate of a tactile display containing pads, said touch plate being controlled by a server, and in this method, (a) tactile information transmitted in the form of a digital word is defined as being a sequence of a predefined number of images together forming a pattern, each image having a rank in the pattern, each pattern being defined by, a drawing of the successive images,
a duration for each image as a function of its rank in the sequence of images,
a duration between successive consecutive images,
a duration between consecutive patterns, (b) said word is transmitted to a tactile display server, preceded by a beacon indicating that data following the beacon must be directed to the touch plate control server, (c) a series of instructions is activated when the tactile display server receives the word, this series having a start address that depends on said word, said series of instructions being used to display the successive images together forming the pattern corresponding to the word to be displayed, said series of instructions being repeated to display the same pattern a predetermined number of times or for a predetermined duration.

A pad is said to be active when it is in a state other than a so-called neutral state that is a reference state. A first pad is in a different tactile state from a second pad if it is possible to distinguish the first and second pads by tactile means.

For some information transmissions, the pattern is a unique image in which all pads are active, the image being repeated a predefined number of times with a predefined duration between images during which no pad is active.

For some information transmissions, the pattern is a single image in which all pads are active, the image being repeated a predefined number of times with a predefined duration between images during which the pads are no longer active, and in which if said pattern is repeated, a duration TIM between patterns is different from the duration between images.

For some information transmissions, the pattern is composed of a sequence of forward and possibly return images, a first forward image in which the active pads form the summits of a first polygon, said first polygon being composed of a closed dummy line joining pairs of active pads, a second forward image in which the active pads form the summits of a second polygon, said second polygon being composed of a closed dummy line joining pairs of active pads, said second polygon being similar to the first polygon and entirely containing, it, and so on as far as a last forward image in which the active pads form the summits of a largest polygon, said largest polygon being composed of a closed dummy line joining the pairs of active pads, said largest polygon being similar to the first and second polygons and entirely containing a last but one polygon similar to the first and second polygons formed in the same way as the last polygon, said last polygon being the largest than can be formed on the touch plate on which the successive tactile images are applied, the forward images possibly being followed by return images, the first return image being the last but one forward image, and so on as far as a last return image that is the first forward image.

For some information transmissions the pattern is composed of a sequence of images varying from a last forward image to a last forward image and possibly to a last return image. A first forward image is an image in which the active pads are those aligned along a first dummy straight line passing through one of the pads on the plate, and parallel to a given direction, said direction being such that for at least one pad on the touch plate, at least one of the lines parallel to this direction contains at least two pads. A second forward image is an image in which the active pads are the pads of a second dummy straight line passing through one of the pads on the plate, parallel to the first dummy straight line and offset by an agreed distance from the first dummy straight line and so on as far as a last forward image in which the active pads are the pads of a last dummy straight line passing through one of the pads on the plate, parallel to the first dummy straight line and offset by an agreed distance from a last but one dummy straight line, said straight line being the last because a subsequent straight line offset from it by the same agreed distance along the same direction would no longer contain any pads. The return images are in order from the last but one forward image and so on as far as a last return image, this image being the last because a subsequent straight line offset from said straight line of the last return image by the same distance and in the same direction opposite to the offset direction of the successive dummy straight lines of the forward images would no longer contain any pads.

For some information transmissions applied to a touch plate for which the pads are arranged in matrix form in lines and columns, a line or a column forming a row, the successive dummy straight lines are parallel to a row and the distance between consecutive dummy straight lines is equal to an integer number of times greater than the distance between two consecutive pads of a row, the integer number being greater than or equal to 1 and less than the number of rows.

A first state of a pad is different from a second state of the same pad or another pad if the first and second states are distinct from each other by at least one of the characteristics given below so that they can be distinguished in a tactile manner, in the first state, the relief position of a pad with respect to the surface of the touch plate is different from the relief position in the second state, vibration modes in the first and second states are different from each other, temperatures in the first and second states are different from each other.

The invention also relates to a tactile display control server comprising, a touch plate, with a touch area on which tactile pads are arranged, the tactile pads being capable of several tactile states distinct from each other, including a so-called neutral state, a network of magnetic coils activating the tactile pads as a function of currents circulating in said coils to produce a tactile feel on the touch area that is a function of the different currents circulating in each of said coils, at least one addressing circuit selectively addressing currents in the different coils, the server being equipped with a software module to translate a global command into a series of values and natures of electrical signals to be addressed to each magnetic coil through the addressing circuit, this series of values and natures of electrical signals conferring a state to each pad, the different states of the different pads forming a design on the touch plate, said design being unchanged either for a predetermined duration at the end of which all pads will return to the neutral state, or for a duration that terminates when a new command is received, the pads then changing state to take on the state resulting from said new global command and to form a new design, server characterised in that the software module also comprises instructions to keep the first design for a predetermined duration, to renew the first design and to replace it by a second design different from or identical to the first design after returning to the neutral state for a predetermined positive or zero duration, and so on as far as a last design different from or identical to a last but one design, the series of designs being timed to define the duration of each design and the duration separating the designs of consecutive ranks forming a series of images, the series of images forming a pattern, and the software also comprising instructions to repeat the pattern thus formed a predetermined number of times or for a predetermined duration, at inter-pattern time intervals (TIM) with an arbitrary positive duration or equal to a duration between consecutive designs in a pattern.

The server according to the invention may also comprise an information link to a tactile display and a tactile display comprising a touch plate with a touch area on which tactile pads are arranged, the tactile pads being capable of several tactile states distinct from each other including a so-called neutral state, a network of magnetic coils activating the tactile pads as a function of currents passing through said coils to produce a tactile feel on the touch area that depends on the different currents circulating in each of said coils, at least one addressing circuit selectively addressing currents in the different coils.

In one embodiment in which the server also comprises the connection and the tactile display, the tactile display also comprises Peltier cells, each cell being arranged to enable a change in the temperature of one or several pads and a second addressing circuit for individually addressing said Peltier cells.

The invention also relates to a device with a nature such that it can be actuated, worn, gripped or held by a user's hand, the device comprising at least one part of the contact surface that is in contact with the user's hand when the device is used, characterised in that it comprises a tactile display server, the touch area of the touch plate of the tactile display forming a part of said contact surface of the device.

In one application, said device is the part of a telephone held in the hand, said telephone comprising a receiver circuit to receive an information flow, a multiplexer receiving information decoded by the receiver circuit and switching information as a function of the nature of the information to devices controlling means of converting the received information into analogue physical magnitudes, the telephone comprising a connection between the multiplexer and the tactile display control server.

In another application, said device is an organiser, said organiser comprising a receiver circuit to receive positioning information for land or satellite beacons, a multiplexer receiving information decoded by the receiver circuit and switching information towards devices for controlling means of converting received information into analogue physical magnitudes as a function of its nature, the organiser comprising a connection between the multiplexer and the tactile display control server.

In another application, said device is a computer mouse, said mouse comprising a receiver circuit to receive positioning information of an index controlled by manoeuvres of said mouse, a multiplexer receiving information decoded by the receiver circuit and switching information towards devices for controlling means of converting received information into analogue physical magnitudes as a function of its nature, the mouse comprising a connection between the multiplexer and the tactile display control server.

In another application, said device is a computer keyboard, said keyboard comprising a receiver circuit to receive information from a system unit of the computer, a multiplexer receiving information decoded by the receiver circuit and switching information towards devices for controlling means of converting received information into analogue physical magnitudes as a function of its nature, the keyboard comprising a connection between the multiplexer and the tactile display control server.

In yet another application, said device is a vehicle steering wheel, said steering wheel comprising a receiver circuit to receive information from sensors arranged onboard the vehicle, a multiplexer receiving information decoded by the receiver circuit and switching information towards devices for controlling means of converting received information into analogue physical magnitudes as a function of its nature, the steering wheel comprising a connection between the multiplexer and the tactile display control server.

BRIEF DESCRIPTION OF THE FIGURES

FIG. 3 comprises parts A to D,

FIG. 4 comprises parts A to H, in which only parts A-C and H are actually represented, FIG. 5 comprises parts A to D, FIGS. 6 and 7 each show a layout of a tactile display comprising a touch plate on the portable part of a portable telephone.

DETAILED PRESENTATION OF PARTICULAR EMBODIMENTS

Figure 1:
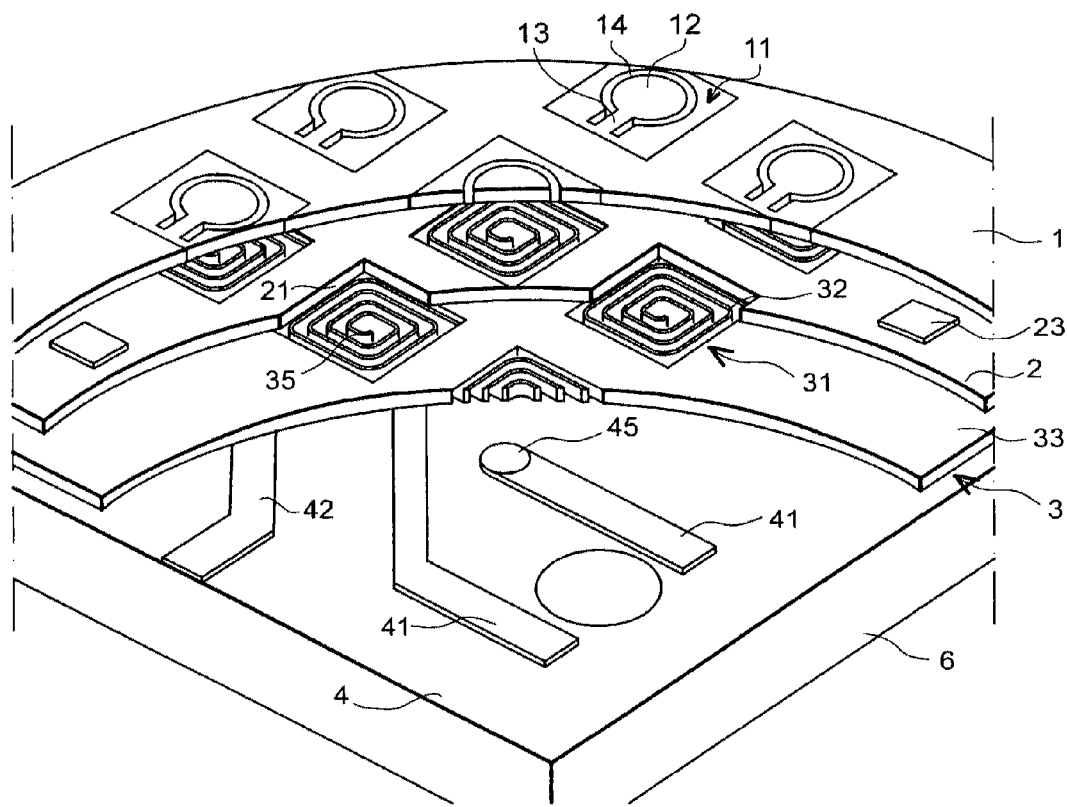
FIG. 1 shows a an exploded perspective view of layers together making up a tactile display forming Peltier cells according to one inventive embodiment of the invention.

The invention is applicable to a touch plate comprising a network of tactile pads. Therefore, the touch plate comprises a touch area on which the tactile pads can be used to modify the tactile sensation felt in contact with the touch plate. Each element may be controlled to obtain a modification of the tactile appearance of the touch area of the touch plate. The tactile appearance of the touch plate is thus dependent of a state of each of its tactile pads.

By stipulative definition, as long as the tactile pads remain all in the same state, the plate presents an image. A state change of at least one of the tactile pads corresponds to an image change. Each image has a duration, which is the time during which each of the tactile pads together forming the touch pad with the touch area keeps the same state. Each particular image is defined by its design. The design of an image is the result of the state of each of the tactile pads compared with its geographic situation on the touch plate. Two images (a first and a second) will be identical with each other if the tactile pads in each of the first and second images at the same geographic location are in the same state in the first and the second image. They will be distinct from each other if this is not the case.

Each element in the network may be activated in three different modes, a vibration mode, a position mode and a temperature mode. In general, in a given embodiment, only one of these modes will be used for practical and for size reasons. However, it is not impossible that several modes could be used on the same touch plate.

In vibration mode, the tactile pads vibrate at a variable frequency fc. A cycle time tc is associated with this frequency that, as we will see in more detail later, is equal to the half period corresponding to the vibration frequency fc of each of the tactile pads.

For example in position mode, a tactile pad may have two positions, a depressed position in which it is flush with the touch area and a relief position in which it projects beyond the touch area. This position mode is not necessarily limited to two positions.

In temperature mode, each tactile pad may have several temperatures with at least two, including one high and one low. This temperature mode is not necessarily limited to two temperatures.

A pattern is defined as being a sequence of several images, a first image, a second image and so on as far as a last image. Thus, a pattern is defined by the number of images that it contains, the design represented on each image with successive ranks from the first to the last, the rate at which images succeed each other in the pattern, in other words the time that elapses between two consecutive images. Up to now, equal times between images in the same pattern have been used in the experiments that have been carried out, for simplification reasons. This equality of times between images within the same pattern is not compulsory. In a given pattern, images with the same rank in the pattern always have the same design, in other words all pads in two images with the same rank in the pattern will be in the same state.

A pattern is said to be repeated when a previous sequence of images together defining a pattern, is repeated. The next sequence of images then has the same number of images as the previous sequence, and an image in the same rank in the previous sequence and the next sequence will have the same design as explained above, in other words all tactile pads will be in the same state, for example if the signal applied to a pad is a vibration signal, it will have the same signal frequency and power, and in all cases the same image duration and the same inter-image duration.

An inter-pattern time of a repeated pattern or a sequence of different patterns is defined, following each other in sequence, as being the time that elapses between the last image of a previous pattern and the first image of a subsequent pattern.

The remainder of the presentation will deal more particularly with tactile images composed of vibration states of tactile pads.

The following table describes an example of six identified vocabulary words. These are words located in an emotion transmission context. Each word associated with an identified emotion for which the name appears in column 1, is associated with a tactile stimulation pattern expressed in column 2 and a possible variation range of parameters defining the pattern in column 3.

| 1 Emotion | 2 Associated stimulation pattern | 3 Parameter relation equations |
| --- | --- | --- |
| Affection | All active. This means that each tactile pad in the touch plate is vibrated. | $DI = 1.76 * TIM + 148$ ms $DI = 2 * TC$ 100 ms < TIM < 350 ms |
| Stress | All active | $DI = 0.8 * TIM + 10$ ms $DI = 2 * TC$ 110 ms < TIM < 350 ms |
| Unpleasant | All active | $FC = 0$ $DI = 50$ ms 400 ms < TIM < 1200 ms |
| Urgency | All active | $TIM = 0$ $TC = 0.11 * DI + 5$ $TC = 0$ for max. intensity" 30 ms < DI < 100 ms |
| Well-being | Divergent/convergent tactile wave | 5 < amplitude < 15 $DI = 0.9$ ms $TIM = 5 * TC - 30$ 10 ms < TC < 30 ms |
| Search | Left-right then right-left scanning | 20 ms < DI < 90 ms $TIM = \max(100.8 * DI - 200)$ $TC = \max(10.20/[90 - 20] * [DI - 20])$ |

In the above table

DI is the image duration

TIM is the inter-pattern time

Tc is the cycle time, which is the half-vibration period for a given tactile pad. For patterns that were used by the inventors up to now, this period is the same for each tactile pad put in a vibration state. But there is no reason why different vibration signals should not be assigned to the pads of an image as a function of their geographic location.

Fc is the cycle frequency, it is the frequency at which a tactile pad vibrates during an image.

The meaning of parameters defined in column 3 in the above table will be described below by an examination of particular example embodiments of the method according to the invention. These example embodiments are within value ranges designed for the different parameters acting in the definition of a tactile pattern.

The words "affection", "stress", "unpleasant" and "urgency" are expressed in the same way, in other words with all tactile pads active with different values of parameters as expressed in the table. It also refers to single image patterns that are meaningful due to the fact that the image is repeated. These single-image patterns may be repeated throughout the time during which a message, for example "affection", is to be sent. It is also possible to group a predefined number of images to create a multi-image pattern. In this case, identical images will be displayed one behind the other, two consecutive images being separated by the inter-image time. After each sequence of the predefined number of images, a new sequence of the same number of images will be executed, this sequence being separated from the previous sequence by an inter-pattern time TIM different from the inter-image time.

When there is no information about the duration between consecutive images being different from a duration between patterns, this means that the single image is repeated with a time between consecutive images equal to the duration indicated for the inter-pattern time TIM.

For the "affection" emotion, all tactile pads on the touch plate are used. All these tactile pads are put into a vibration state using the methods described below.

The duration of an image is equal to 1.76 times the duration that elapses between two patterns plus 148 ms. Each element modifying the tactile feel vibrates once during the duration of an image. This is expressed by the fact that the duration of an image is equal to two half-vibration periods Tc. The time TIM between two patterns, in this case two images, is between 100 and 350 ms. Thus for example, if the time TIM between two patterns is equal to 200 ms, the duration of an image will be 500 ms (200*1.76+148=500). This duration is equal to the vibration period of the elements, namely a vibration frequency fc equal to 2. In this example, the "affection" emotion will consist of 500 ms images during which all tactile pads vibrate at a frequency of 2, separated from each other by inter-image times of 200 ms during which the tactile pads no longer vibrate.

For the "stress" affection, and if for example an inter-pattern time TIM of 200 ms is used, the image duration will be 170 ms. This duration is equal to the vibration period 2Tc of a pad. In this example, the "stress" emotion will be translated by 170 ms images during which all tactile pads vibrate at a frequency $fc=1/0.170$, separated from each other by 200 ms inter-image times during which the tactile pads no longer vibrate.

For the "unpleasant" affection, an inter-pattern time TIM of 500 ms may be used for example, and the duration of the images is 50 ms. Note that Tc is equal to 0. This means that a sequence of equally brief pulses are sent to each pad, so that the inertia of the tactile rendering device can be used. These pulses are repeated throughout the duration of an image, namely 50 ms in this case.

In this example, the "unpleasant" emotion will be represented by 50 ms images during which all tactile pads receive brief pulses. Images are separated from each other by 500 ms inter-image times during which the tactile pads no longer receive any pulses.

For the emergency affection, if for example an image duration DI equal to 50 ms is used, the half-vibration period Tc of the pad is 10.5 ms and the period is 21 ms. The inter-pattern duration is 0, therefore this means that 50 ms images will be obtained during which the pad will have two complete vibration periods. The fact that the intensity is maximum means that a current with a maximum value that can be applied to a control coil of the pad, is actually applied to said coil. This corresponds to a maximum power generated by each coil.

Before describing the following vocabulary words, the characteristics of the tactile display comprising the touch plate with which experiments were carried out, will now be explained with reference to FIG. 1.

The plate 10 is of the type made in accordance with the plate disclosed in patent application FR 02 15527 deposited on Sep. 12, 2002 corresponding to patent application WO, PCT FR 03 50152 deposited on Mar. 12, 2003. A brief description of the tactile display disclosed in this application is made above with reference to the description of prior art. All variants of such a touch plate, particularly as a function of the shape of the pads, may be useful for the application envisaged herein. Other tactile displays could also be suitable if they can be used to individually control the states of pads. A tactile display as defined by prior art was used during studies that were carried out initially to define the information transmission method according to this application. Studies are currently being carried out with a similar tactile display but that includes firstly Peltier cells associated with each pad or a group of pads adjacent to each other, and secondly a second addressing circuit used to individually address Peltier cells. Such a configuration can assign an additional state dependent on a temperature, to a pad or a group of pads. FIG. 1 shows an enlarged and perspective view of layers together forming the main structure of such a tactile display also comprising Peltier cells.

The tactile display comprises a printed circuit layer 4 forming an addressing circuit mounted on a substrate 6. The layer 4 is composed of an insulating support on which conducting tracks 41 are plotted, each joining an edge of the printed circuit to a contact end 45 of the track with an end of a coil 31 belonging to a layer 3. The layer 3 is a layer containing control coils 31 of the tactile pads. It is located immediately above the layer 4. It is composed of an insulating support 33 comprising a spiral conducting track 32, each of the tracks forming one of the flat coils 31. The construction of such coils is known in itself and will not be described herein. One end 35 of a conducting track 32 forming a coil 31, for example the central end of this track, is in contact with a contact end 45 of a conducting track 41 of the addressing circuit 4.

Two tracks 41 can be seen in FIG. 1. One of the contact ends 45 of the track 41 with one end of a coil 31 is visible, and the other is hidden by the layer 3 of coils.

Each track 41 of the addressing circuit addresses one and only one coil 31 in the coil layer 3. In the example commented upon herein, the layer 3 of coils 31 comprises eight lines each containing eight coils 31. The coils are formed in a matrix network. This arrangement is not compulsory.

The locations of coils 31 are arranged such that the magnetic field of a coil is high at the tactile pad that it activates, for example due to the fact that a coil is facing a mobile part forming the tactile pad for example a blade, and low at tactile pads not controlled with this coil.

An electrically insulating layer 2 is located immediately above the layer 3 of flat coils 31. This layer 2 comprises a first set of recesses 21. The recesses 21 in this first set are designed to enable movement of the blades 12 each forming a tactile pad 11. In a new manner not known in prior art, the layer 2 contains a second set of recesses 22. Each recess 22 in the layer 2 can be used to hold a Peltier cell 23. In the example shown, there are four cells 23 arranged laterally along each of the outside edges of the matrix formed by the set of 8.times.8 tactile pads 11. These cells 23 are controlled simultaneously by means of supplementary tracks 42 of the addressing circuit 4, only one of which is shown. These tracks are in communication with vias not shown passing through layers 3 and 2 and terminating by contact points with electrical connections of Peltier cells. This embodiment will modify the temperature state of the surface 1 of the touch plate 10 as a whole.

In one embodiment not shown, the layer 2 comprises a recess 22 for each tactile pad 11. In this embodiment, each recess 22 and the cell that it houses is in the shape of a ring surrounding a straight projection of the recesses 14 delimiting the blades 12 forming the pads 11.

In another embodiment not shown, the layer 2 comprises a recess 22 for each group of tactile pads adjacent to each other. In this embodiment, each recess 22 and the cell that it houses are in the shape of a ring surrounding a straight projection of a contour of the group of recesses 14 delimiting a group of blades 12 forming the group of pads 11 contained in said contour.

In yet another embodiment not shown, the layer 2 comprises a recess 22 for each row or column of pads. In this embodiment, each recess 22 and the cell that it houses are in the shape of a rectangle housed along straight projections of two consecutive lines or consecutive columns of recesses 14 belonging to said consecutive lines or consecutive columns respectively. In one variant of this embodiment, there are one or two additional Peltier cells arranged laterally along the lines or columns of the outermost tactile pads.

Finally, the touch plate 10 composed for example of a magnetic metal sheet, lies immediately above the insulating layer 2 comprising the recesses 21 and possibly 22 housing the Peltier cells 23. In the example shown, the blade 12 forming each of the elements modifying the tactile feel, is conforming with the example shown in FIG. 2. This figure will now be commented upon.

Figure 2:
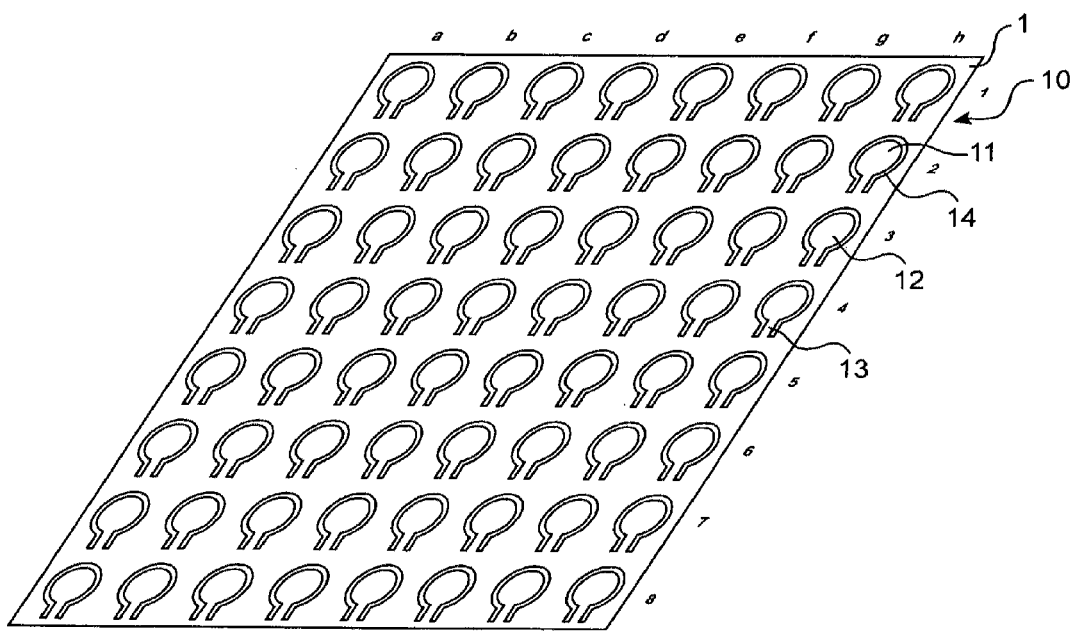
FIG. 2 shows a top view of a touch plate comprising 8 lines of 8 tactile pads arranged in lines and columns.

FIG. 2 only contains the top view of the touch plate showing its touch area 1. This plate 10 comprises pads 11 arranged in matrix form in lines and in columns. In the example shown, it is a square matrix comprising eight lines numbered from 1 to 8 and eight columns identified from a to h.

Each tactile pad 11 is in the form of a single blade 12. A large part of the perimeter of each single blade 12 is freed from the continuum of a layer for which the upper surface 1 is the surface of the touch plate 10, by a recess 14 that entirely surrounds the blade 12 except for a part in which this blade 12 is connected to the continuum of the touch plate 10 through an arm 13 connecting the blade 12 to said continuum. Each pad 11 is thus composed of the blade 12 and the arm 13 that connects it to the continuum on the plate 10.

In the experimental model, the distance between two consecutive pads of a line or a column is 5 mm. The maximum deformation outside the plane is 100 µm. This deformation represents what is called the actuation amplitude of the tactile pad.

The pass band is 800 Hz.

The maximum force generated by each pad is 13 mN.

Each pad can be addressed independently of other pads.

Figure 3C:
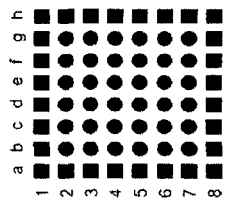
FIGS. 3, 4, and 5 diagrammatically show different designs for making different patterns.
Figure 3B:
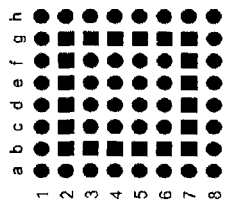
Figures 3A, 3D:
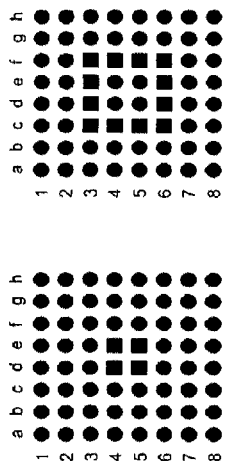
Figure 4C:
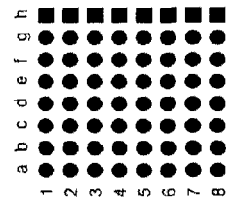
Figure 4B:
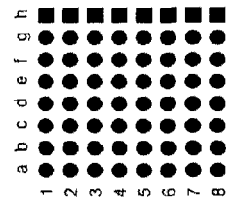
Figures 4A, 4H:
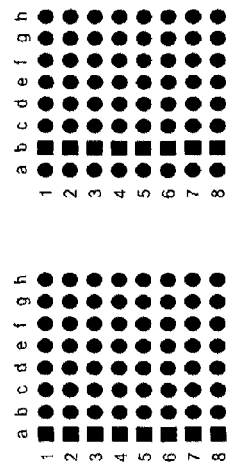

Having given the above clarifications, the words "well-being" and "search" will now be commented upon with reference to FIGS. 3 and 4.

For the "well-being" emotion, for example a duration of the half period Tc of vibration of the pad equal to 20 ms can be used, and the inter-pattern duration is 70 ms. An example of a convergent/divergent tactile wave designed to represent the "well-being" emotion will now be commented upon with reference to FIG. 3. This figure comprises parts A, B, C and D. Each of these parts represents an image of a pattern. For the "well-being" emotion, the pattern is composed of four images represented on parts A-D of FIG. 3. Each image represents the 64 pads in the symbolic form of dots for inactive pads and squares for active pads. On image A, elements defining a first contour of a first square are active, in other words they are vibrating. This first contour is defined as being the smallest most central square that can be formed by joining two consecutive pads in a first line, then each of the two pads to the closest vertical pad to reach the two consecutive pads in a second line consecutive to the first line, and finally a segment joining the two consecutive pads reached. This central square contour is the line that is formed by joining the squares d4, e4, e5 and d5.

In the second image, image B, the pads forming a second square of the next larger size that fully contains the first square are active. In the third image, image C, the pads forming a third square the next larger size after the second square and that fully contains the second square are active. Finally, in the fourth image, image D, the pads forming a fourth square with the next larger size that fully contains the third square are active. In the shown example, all pads 11 located around the periphery of the touch plate 10 are involved.

Thus, for transmission of the "well-being" word, each image lasts for 0.9 ms, and the duration between two consecutive images is 0.1 ms. No pad is active during the time between consecutive images, in other words no pads vibrates. Thus in the example that has just been described, it is possible to have a pattern with four images, the pattern being composed of images A, B, C and D. The pattern is repeated starting from image A and repeating the same sequence of images A, B, C and D. It is also possible to have a patterns composed of 7 images, A, B, C, then D in order and then the return, in other words C, B and then return to image A.

Therefore, this last pattern lasts for 7 ms

Since the inter-pattern duration is 70 ms, the period of a pattern is 7 ms+70 ms=77 ms The fact that the duration Tc of the vibration half period is 20 ms translates the fact that the active pad will remain for example in the high state in relief throughout the duration of an image since the duration of an image is 0.9 ms. The command to return to neutral between images takes priority over the pulse command determining the vibration period of the tactile pad. This means that the tactile pad 11 will return to the neutral state, for example the low state, for example flush with the touch plate throughout the next 20 ms.

Thus, in the pattern that has just been described, if the pattern starts to be sent at initial instant t0, the four pads of the first square change from the low state to the high state. These four pads in the first square return to the low state 0.9 ms later and remain in it. The same is true for pads in the second square for the next ms and so on.

The word "search" will now be commented upon in relation to FIG. 4.

The duration of an image plus the inter-image time is between 20 and 90 ms.

For example, we will use an image duration of 50 ms and an inter-image duration of 5 ms. The maximum inter-pattern time TIM is then 100.8*55−200=5344 ms Tc=10.20*35/70=5.1 ms.

In image A, only the pads in a first column (a) that is the leftmost column vibrate. They vibrate with a half vibration period of 5.1 milliseconds, in other words they rise and fall about ten times during image A. They remain in the low state during and after the inter-image period. After 55 ms, the pads in the second leftmost column (b) start vibrating in the same way as the pads in the first column (a) as shown in image B, and so on as far as the last column (h) that stops vibrating 55*8 ms after the first column (a) began to vibrate, as shown in image H. At this moment, the same image sequence begins but this time from right to left. After image H, the next image is image G then F etc., and finally image A once again. The pattern then terminates, and there is a waiting time of 5.344 seconds during which all pads are in the neutral state before beginning the same pattern again.

The pattern that has just been described comprises 15 images, A, B, C, D, E, F, G, H, G, F, E, D, C, B in order. It would also be possible for it to contain only 8 images, if it was decided to do a forward path from image A to image H and then restart the same forward path, instead of doing a forward path from image A to H followed by a return from image H to image A.

Figure 5C:
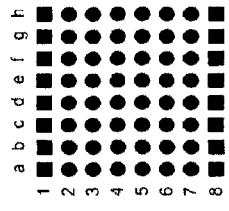
Figure 5B:
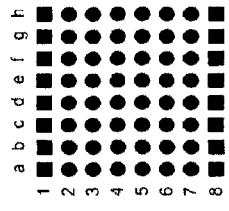
Figures 5A, 5D:
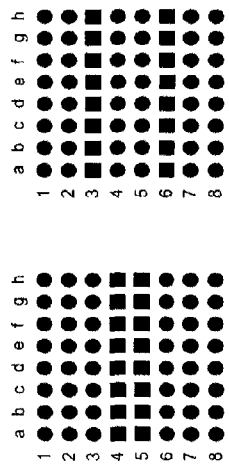

The example shown with reference to FIG. 5 will now be commented upon. In this example, there are always two lines of active tactile pads, except for a first image when the number of lines is odd. In a first image shown in part A of FIG. 5, the two active lines are two consecutive lines numbered 4 and 5 closest to the centre of the touch area. If the number of lines had been odd, only the line closest to the centre would have been active. In the second image shown in B, the lines numbered 3 and 6 are active, these are consecutive lines after the lines activated in the first image. These two lines are closer to the outermost lines than the two lines activated during the first image. During the third image, the next two consecutive lines on the outside are activated, and finally in image D the outermost lines are activated. The pattern then continues returning from image D to image C and so on to image A. Therefore the pattern includes a sequence of images A, B, C, D, C, B, and A. Finally, the same pattern is repeated after the inter-pattern time.

Thus for this pattern, the most central line or the most central two lines are activated in the first image, depending on whether the number of lines is odd or even respectively, and then in a second image the two consecutive lines outside the lines activated during the previous image are activated, and so on as far as the outermost lines are reached in an image n, and then the procedure returns towards the centre by redisplaying images n−1, n−2, and so on until returning to the first image. It is also possible to do only the forward paths as in the cases commented upon with reference to FIGS. 3 and 4, for example from the centre to the periphery as shown by the sequence of images A to D, and then to start again at image A, or simply to do return paths from image D to image A.

In the example patterns commented upon with reference to FIGS. 4 and 5, it is naturally possible to replace lines by columns and vice versa. It is also possible to progress through consecutive images by offsetting active lines by modulo p, in other words moving from one image to the next image by offsetting the lines for example by p lines instead of a single line as described in the examples.

According to the examples described above, it can be seen clearly that a number of parameters can be varied such as:
- the design of an image, this design corresponding to a pad vibration frequency, a force applied to the pad, a relief position of said pad, or a temperature, for each pad as a function of its geographic position,
- the image duration,
- the duration between images,
- the design of successive images and the number of images to define a pattern,
- a duration between patterns, to define a vocabulary word.

We will now describe several examples of devices in which the introduction of a tactile display comprising a touch plate and provided with a server capable of producing patterns built up by a sequence of images following reception of a command word, provides said device with an additional attractive feature and improves the efficiency of the basic function of the device.

Figure 6:
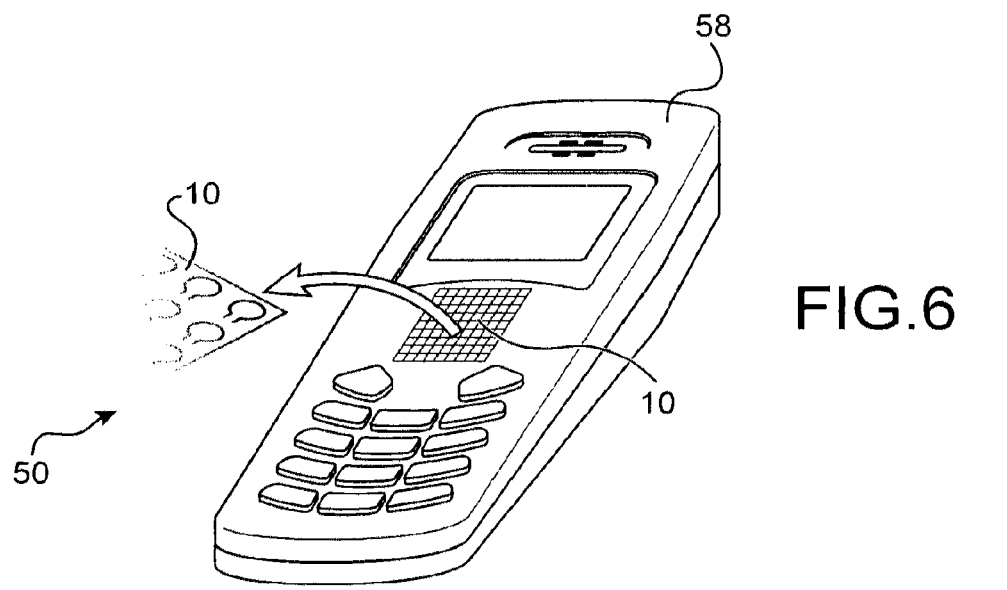
Figure 7:
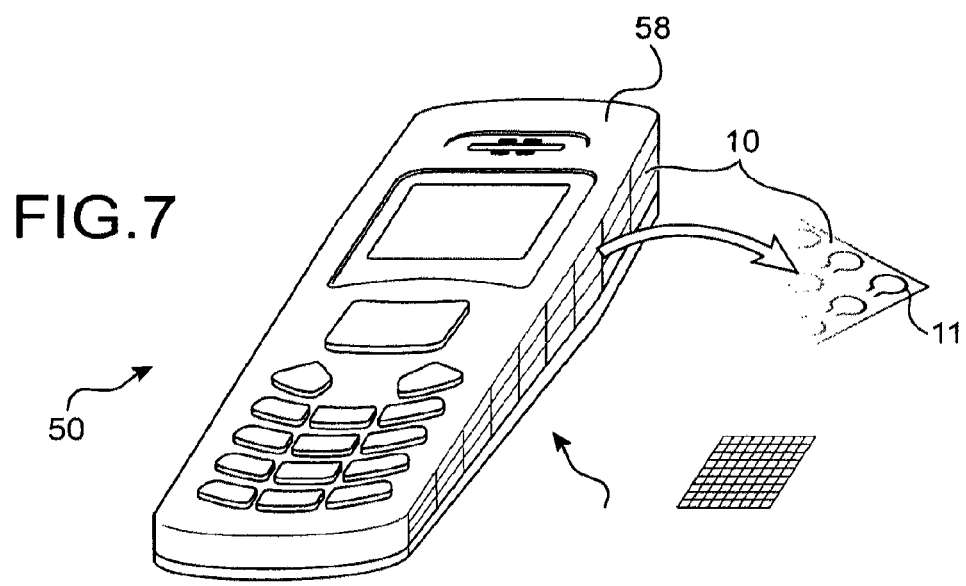
FIG. 7 comprises a part A that is a front view of the telephone and a part B that is a side view.
Figure 8:
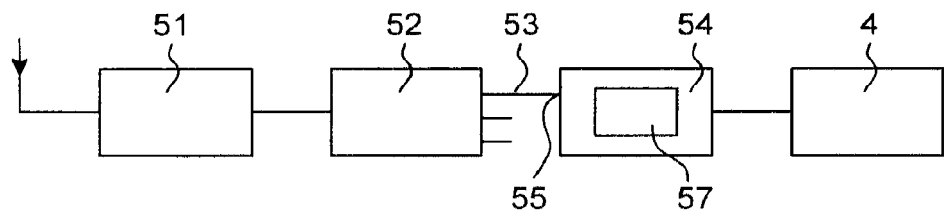
FIG. 8 diagrammatically shows an electronic circuit of a telephone implementing a tactile display according to the invention.

FIGS. 6 and 7 each show the layout of a tactile display comprising a touch plate 10 on the portable part 50 of a portable telephone. It could also be the portable part of a wireless telephone or a telephone handset.

In FIG. 6, the touch plate 10 is laid out on a front face 58 comprising the headset and the microphone of the telephone 50. In FIG. 7, the touch plate 10 is located on a side face of the telephone 50. This position enables contact with the fingers or the palm of the hand, depending, on how the telephone 50 is held. Finally, the touch plate 10 could also be located on a back face of the telephone 50 so as to be in contact with the palm of the hand, although this is now shown in the figure. Since the transmitted information is composed of a sequence of patterns, there is no need for the part of the human body in contact with the touch plate to enable strong discrimination of tactile pads, as is the case for example for Braille reading.

Concerning the circuits, as shown symbolically in the figure, the telephone 50 provided with the tactile display comprising its touch plate 10 comprises a receiver 51 receiving and decoding a reception flow, a multiplexer 52 receiving decoded information and switching it depending on its nature to an analogue conversion device appropriate to the transducer necessary for transcription of the information, for example data that can be displayed on a screen or sound data restored by a headset. In the case of a telephone with a tactile display comprising a touch plate, the multiplexer comprises an output 53 specific to the tactile information. The telephone also comprises a server 54. The server 54 is equipped with a software module 57 to translate each individual global command, for example a command word such as "affection" into a series of values and natures of electrical signals to be addressed to each magnetic coil 31 controlling the pads or possibly to the Peltier cells 23 through the addressing circuit 4 of the pads 11 on the plate 10. The software module 57 may comprise instructions for this purpose, together forming a routine, with one separate routine for each individual global command. The memory address of the first instruction in the routine depends on the individual global command. Alternately, the software module 57 may comprise instructions together forming a routine, with one individual command per routine, the instructions comprising search instructions for values of parameters at a specified memory address. This latter method of proceeding has the advantage that for a given word, the user can specify parameter values such as the image duration, a pad vibration frequency, an inter-image duration, and in general all parameters contributing to modifying the impression given by the touch plate for which the pads are active in relation with these parameters. The series of values and the nature of the electrical signals confers a state to each pad 11. The different states of the different pads 11 form a design on the touch plate 10. Said design is kept unchanged either for a predetermined duration at the end of which all pads will return to the neutral state, or during a duration that terminates on reception of a new command, the pads then changing state to enter the state resulting from said new global command, and form a new design.

The software module 57 also comprises instructions to keep the first design for a predetermined duration, renew the first design and replace it by a second design different from or identical to the first after a return to the neutral state for a positive or zero predetermined duration, and so on as far as the last design different from or identical to a last but one design, the series of designs being timed in terms of the duration of each design and the duration separating designs with consecutive ranks forming a series of images, the series of images forming a pattern, and the software module 57 also comprising instructions to repeat the pattern thus formed at inter-pattern time intervals (TiM) of any positive duration or equal to a duration between consecutive drawings in a pattern, for a predetermined number of times or for a predetermined duration.

Figure 9:
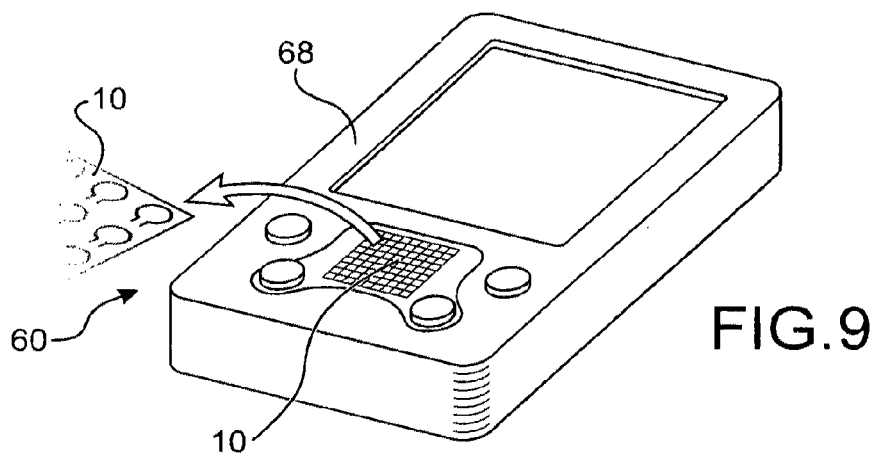
FIG. 9 shows an organiser implementing a tactile display, FIG. 10 diagrammatically shows an electronic circuit of an organiser implementing a tactile display according to the invention.
Figure 10:
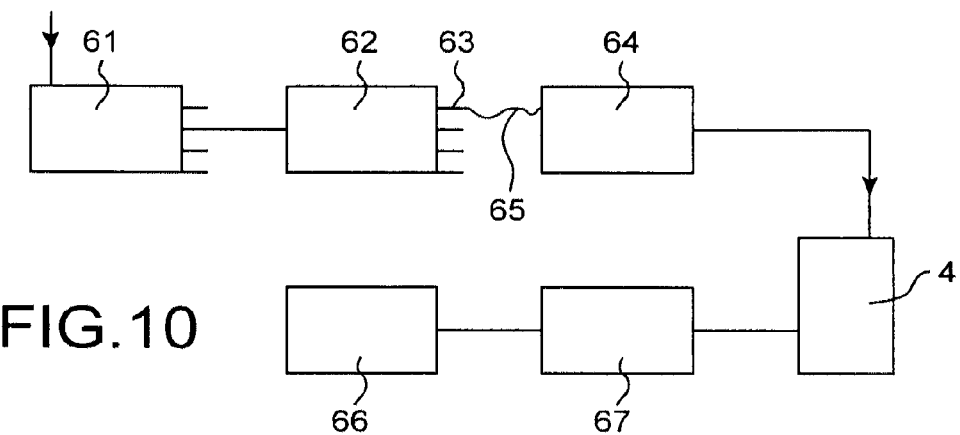

FIG. 9 shows another device 60 on which a tactile display is located comprising a touch plate 10 and its control server. Said device is an organiser 60. A touch plate 10 is present on a part of the surface 68 that a user can touch with parts of his hand. Said organiser 60 comprises a receiver circuit 61 internally as symbolically shown in FIG. 10, said receiver circuit 61 particularly being capable of receiving positioning information from land or satellite beacons and deducing a geographic position of said receiver 61. The organiser is equipped with a multiplexer 62 receiving information decoded by the receiver circuit 61 and switching information as a function of is nature to devices for controlling means of converting information received into analogue physical magnitudes. In particular, the multiplexer 62 receives geographic position information. In particular, the multiplexer 62 is equipped with an output 63 receiving geographic position information. The output 63 from the multiplexer 62 is connected through a connection 65 to a server 64 controlling the tactile device 10. The organiser also comprises a memory 66 on which a two- or three-dimensional map is loaded. An itinerary is also loaded. When the itinerary is loaded into the memory space 66, a software module 67 controlling the tactile display commands the tactile pads 11 of the touch plate 10 as a function of this itinerary information to reproduce the geometric shape of the itinerary or only part of the itinerary that is a part in which the receiver 61 is located. A pad corresponding to the real geographic position of the receiver 61 is controlled in an agreed manner, for example a particular vibration frequency. The organiser thus equipped can help a partly blind person to position himself in a natural environment. Displacements of the partly blind person will be retranscribed using the GPS receiver 61 and the software module 67 on the displayed itinerary and a tactile pad vibrating in an agreed manner moves on the touch plate 10. Obstacles are denoted either with tactile pads that vibrate at a different frequency or tactile pads receiving commands in relief mode. This enables the partly blind person to position himself at least in a relative manner in a given environment. It also provides a means of displaying direction type messages by sending a word, for example meaning "straight on" or "turn left", etc. Obviously, there is a particular pattern corresponding to each word, as mentioned above. Thus, a partly blind person could be informed at any time that he should turn to the left, to the right or at a certain angle, for example by moving a straight line of vibrating pads at a given agreed frequency from the left towards the right on the touch area 1. Thus, navigation strategies could be programmed, that a person could learn and memorise in advance.

Figure 11:
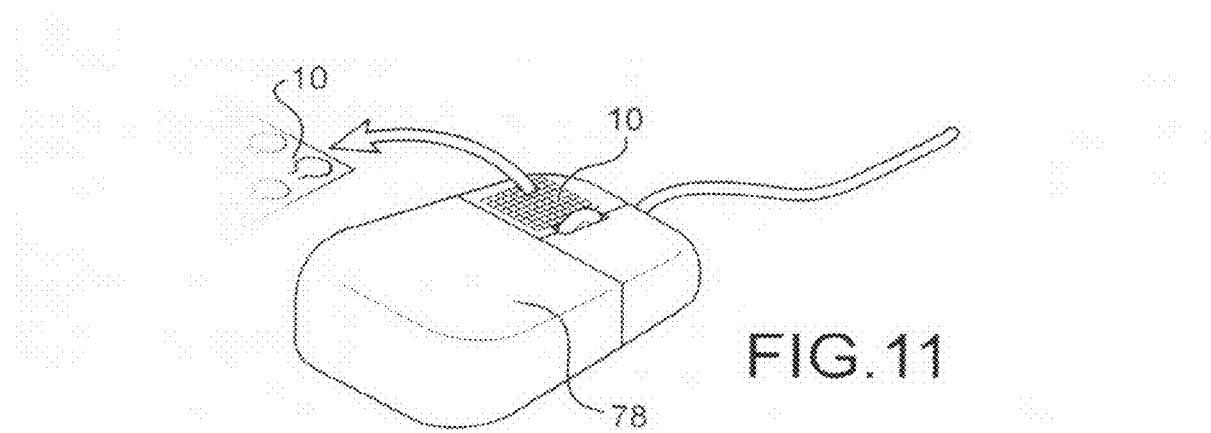
FIG. 11 shows a computer mouse implementing a tactile display, FIG. 12 diagrammatically shows an electronic circuit of a computer mouse implementing a tactile display according to the invention.
Figure 12:
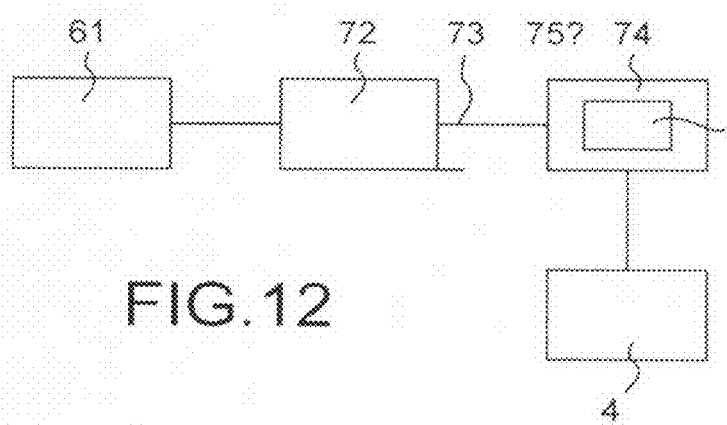

FIG. 11 shows another device 70 on which a tactile display is installed comprising a touch plate 10 and its control server. Said device is a computer mouse 70. A touch plate 10 is present on part of the surface 78 that a user can touch with parts of his hand. This touch plate 10 may be located on one (or both) of the buttons of the mouse. It can also be located on each side of the mouse because these are areas that are also in contact with the fingers when the mouse is gripped. Said mouse 70 comprises a receiver circuit 71 on the inside as shown symbolically in FIG. 12, to receive positioning information of an index finger controlled by manoeuvres of said mouse. In particular, a multiplexer 72 receives positioning information decoded by the receiver circuit 71. The multiplexer 72 switches the information as a function of its nature towards devices for controlling means of converting received information into analogue physical magnitudes. In particular, it could be visual information to display for example a position depending on a particular symbol as a function of the position, sound or other information. An output 73 from the multiplexer 72 can be used to connect the multiplexer 72 of the mouse through a connection 75 to a control server 74 of the tactile device 10. The server 74 is equipped with a software module 77 that then controls a tactile display as a function of the position of the mouse and the nature of the position. The nature of the position means positions corresponding to the different commands or icons or window limits or others.

For example, it is then possible for a partly blind person to define a strategy firstly for determining whether or not the cursor of the mouse is positioned on an icon type zone. It is also possible to add tactile words in the form of new patterns (therefore by varying the different parameters affecting the patterns) to differentiate each button from the other buttons. For example, the "search" tactile word commented upon above could be associated with the search button in the Windows® start menu, and another tactile word could be associated with an <<"OK or VALIDATE>> type button.

In particular, a touch plate 10 thus installed also enables a partly blind person to feel around different window contours. Finally, adjustments can be made to the software module 77 controlling the touch plate 10 to display different textures or exploration feel of a surface. This enables the user to know, for example, that he is currently exploring two different zones representing two distinct windows.

Figure 13:
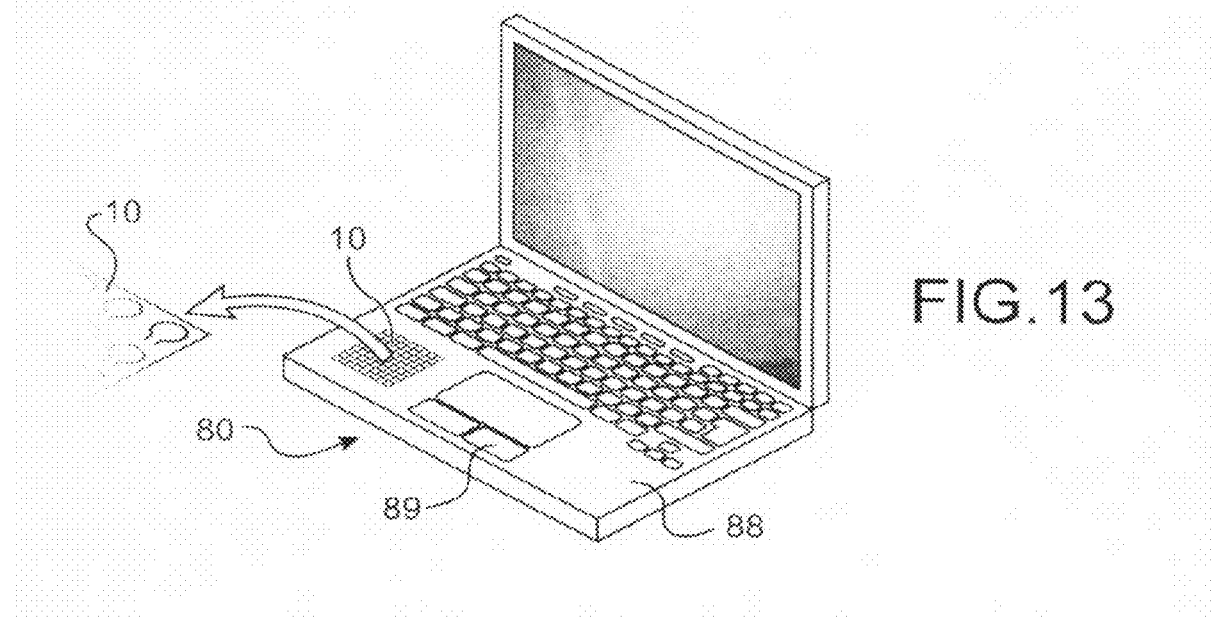
FIG. 13 shows a computer comprising a keyboard implementing a tactile display, FIGS. 14 and 15 each show a vehicle steering wheel implementing a tactile display, in FIG. 14 the display is in two parts and in FIG. 15 the display is distributed around the periphery of the steering wheel.

It would also be possible to locate the touch plate 10 with its software control module 77 on a dedicated peripheral or on the zone 88 of a keyboard 89 of a computer 80. This configuration shown in FIG. 13 enables a partly blind person to use his computer to read text type files. A software module transforms a text type file in ASCII characters into a Braille type file. Said file is then displayed in sequence letter by letter or word by word or line by line depending on the surface 1 of the touch plate 10 on said surface 1. Tactile words as defined above can also be displayed on the same surface 1, with other tactile information to enable better interaction between the user and his operating system or during an Internet type application. Note that in the case of a computer mouse, all functions mentioned above can be transposed to the case of the touch plate on a keyboard position.

Figure 14:
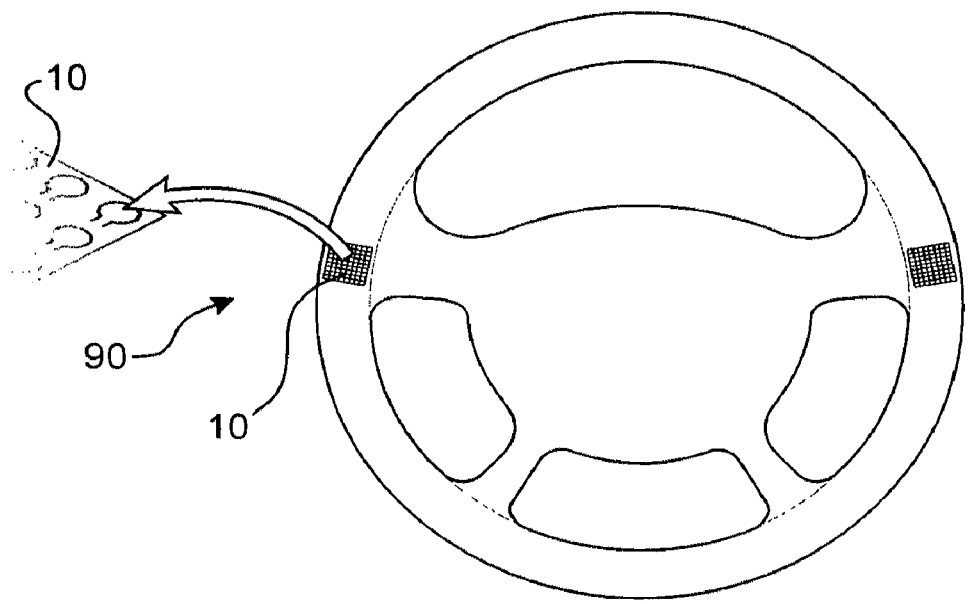
Figure 15:
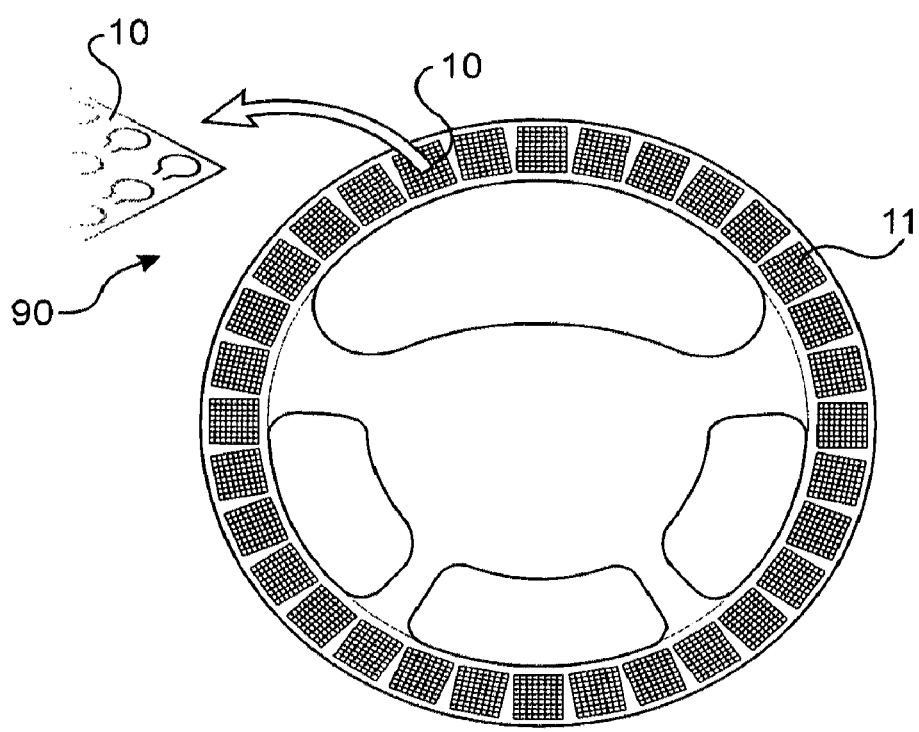

FIGS. 14 and 15 represent another device 90 on which at least one tactile display is located, comprising a touch plate 10 and its control server. In this case it is the steering wheel 90 of a vehicle.

In the example shown in FIG. 14, there are two touch plates 10. It could also be considered that there it is a single touch plate in two parts, because it is sufficient to have a single software module to control the two plates. The software module is not necessarily installed in the steering wheel. In particular, it could be located in a memory area of a vehicle onboard computer.

Increasing demands are being made on the visual sense of a driver in an automobile environment. For example, by including touch plates 10 on a steering wheel of a vehicle, information can be transmitted to the driver without the driver having to look away from the road and without even stopping listening to the onboard radio.

The two touch plates 10 fitted on a steering wheel thus enable the driver to receive tactile information, for example on the thumbs of his two hands. For example in this case, one example use could be for a vehicle equipped with a navigation system, to assist the driver by means of tactile messages such as "turn to right" or "turn to left". The software implementation of such of device is the same as that described with reference to the organiser 60. In this case, the position information originates from the navigation system specific to the vehicle.

In the case shown in FIG. 15, the touch plate 10 matches the shape of a steering wheel contour. Thus, for example a plurality of tactile pads are distributed around the contour of the steering wheel or on only part of it, for example a lower part on which the driver normally rests his hands. The driver can thus perceive tactile information when gripping the steering wheel. Sensor systems already exist integrated into the vehicle capable of detecting proximity of an obstacle at the back, front and even on the sides of a vehicle. The information generated by these sensors is transmitted particularly to the software command module of the touch plate 10 so as to notify the driver for example in the case in which there is an obstacle present and the position of the obstacle with respect to the vehicle due to the tactile pads present on the steering wheel. Thus when used with a sensor defining if the continuous white line to the right of the vehicle is crossed, the driver can be notified when this happens by a tactile message, for example by triggering sending the STRESS tactile message on the tactile pads 11 of the touch plate 10 located on the right part of the steering wheel. All these examples could be considered as navigation assistance examples without the driver needing to look at them.

The invention claimed is:

1. Method of transmitting tactile information to a touch plate (10) of a tactile display containing tactile pads (11), said touch plate (10) being controlled by a server (54, 64, 74), and in this method,
   (a) tactile information transmitted in the form of a digital word is defined as being a sequence of a predefined number of images together forming a pattern, each image having a rank in the pattern, each pattern being defined by:
      a design of successive images, the designs corresponding to a first and to a second image being identical to each other if the tactile pads in the first design and the tactile pads in the second design in the same geographic position in each of the first and the second images are in the same state, and being distinct from each other if they are not in the same state,
      a duration for each image as a function of its rank in the sequence of images,
      a duration between successive consecutive images,
      a duration between consecutive patterns;
   (b) said word is transmitted to a tactile display server (54, 64, 74), preceded by a beacon indicating that data following the beacon must be directed to the touch plate control server;
   (c) a series of instructions is activated when the tactile display server receives the word, this series having a start address that depends on said word, said series of instructions being used to display the successive images together forming the pattern corresponding to the word to be displayed, said series of instructions being repeated to display the same pattern a predefined number of times or for a predetermined duration.

2. The method of transmitting tactile information according to claim 1 in which the pattern is a unique image in which pads (11) are active, the image being repeated a predefined number of times with a predefined duration between images during which no pad (11) is active.

3. The method of transmitting tactile information according to claim 1 in which the pattern is a single image in which all pads (11) are active, the image being repeated a predefined number of times with a predefined duration between images during which the pads (11) are no longer active, and in which if said pattern is repeated, a duration TIM between patterns is different from the duration between images.

4. The method of transmitting tactile information according to claim 1 in which the pattern is composed of a sequence of forward images, a first forward image in which the active pads (11) form the summits of a first polygon, said first polygon being composed of a closed dummy line joining pairs of active pads (11), a second forward image in which the active pads form the summits of a second polygon, said second polygon being composed of a closed dummy line joining pairs of active pads (11), said second polygon being similar to the first polygon and entirely containing it, and so on as far as a last forward image in which the active pads (11) form the summits of a largest polygon, said largest polygon being composed of a closed dummy line joining pairs of active pads (11), said largest polygon being similar to the first and second polygons and entirely containing a last but one polygon similar to the first and second polygons formed in the same way as the last polygon, said last polygon being the largest that can be formed on the touch plate on which the successive tactile images are applied.

5. The method of transmitting tactile information according to claim 1 in which the pattern is composed of a sequence of forward and return images, a first forward image in which the active pads (11) form the summits of a first polygon, said first polygon being composed of a closed dummy line joining pairs of active pads (11), a second forward image in which the active pads form the summits of a second polygon, said second polygon being composed of a closed dummy line joining pairs of active pads (11), said second polygon being similar to the first polygon and entirely containing it, and so on as far as a last forward image in which the active pads (11) form the summits of a largest polygon, said largest polygon being composed of a closed dummy line joining pairs of active pads (11), said largest polygon being similar to the first and second polygons and entirely containing a last but one polygon similar to the first and second polygons formed in the same way as the last polygon, said last polygon being the largest that can be formed on the touch plate on which the successive tactile images are applied, the forward images possibly being followed by return images, the first return image being the last but one forward image, and so on as far as a last return image that is the first forward image.

6. The method of transmitting tactile information according to claim 5 applied to a touch plate (10) for which the pads (11) are arranged in matrix form in lines and columns, a line or a column forming a row, in which the successive dummy straight lines are parallel to a row and in which the distance between consecutive dummy straight lines is equal to an integer number of times greater than the distance between two consecutive pads of a row, the integer number being greater than or equal to 1 and less than the number of rows.

7. The method of transmitting tactile information according to claim 1 in which a first state of a pad (11) is different from a second state of the same pad (11) or another pad if the first and second states are distinct from each other by at least one of the characteristics given below,
   in the first state, the relief position of a pad (11) with respect to the area (1) of the touch plate (10) is different from the relief position in the second state,
   vibration modes in the first and second states are different from each other,
   temperatures in the first and second states are different from each other.

8. Tactile display comprising,
   a touch plate (10), with a touch area (1) on which tactile pads (11), are arranged, the tactile pads (11) being capable of several tactile states distinct from each other, including a so-called neutral state,
   a network of magnetic coils (31) activating the tactile pads (11), as a function of currents circulating in said coils (31) to produce a tactile feel on the touch area (1) that is a function of the different currents circulating in each of said coils (31),
   at least one addressing circuit (4) selectively addressing currents in the different coils (31),
   a control server (54, 64, 74) being equipped with a software module (57, 67, 77) to translate an individual global command among a plurality of possible individual global commands into a series of values and natures of electrical signals to be addressed to each magnetic coil (31) through the addressing circuit (4), this series of values and natures of electrical signals being a function of each individual global command and conferring a state to each pad (11), the different states of the different pads (11) forming a design on the touch plate (10), said design being unchanged either for a predetermined duration at the end of which all pads (11) will return to the neutral state, or for a duration that terminates when a new command is received, the pads (11) then changing state to take on the state resulting from said new global command and to form a new design, the server comprising an information connection (55, 65, 75) to the tactile display wherein said software module (57, 67, 77) also comprises instructions to keep the first design for a predetermined duration, to renew the first design and to replace it by a second design different from or identical to the first design after returning to the neutral state for a predetermined positive or zero duration, and so as far as a last design different from or identical to a last but one design, the series of designs being timed such that the duration of each design and the duration separating the designs of consecutive ranks forming a series of images, the series of images forming a pattern, and the software module (57, 67, 77) also comprising instructions to repeat the pattern thus formed a predetermined number of times or for a predetermined duration, at inter-pattern time intervals (TIM) with an arbitrary positive duration or a duration equal to a duration between consecutive designs in a pattern.

9. The tactile display according to claim 8 comprising Peltier cells (23), each Peltier cell (23) being arranged so that the temperature of one or several pads (11) can be modified, and a second addressing circuit (4, 42) that can be used to individually address said Peltier cells (23).

10. Device (50, 60, 70, 80, 90) with a nature such that it can be actuated, worn, gripped or held by a user's hand, the device (50, 60, 70, 80, 90) comprising at least one part of the contact surface (58, 68, 78, 88) that is in contact with the user's hand when the device is used, characterised in that it comprises a tactile display according to claim 8, the touch area (1) of the touch plate (10) forming a part of said contact surface (58, 68, 78, 88) of the device.

11. Device according to claim 10, characterised in that said device (50, 60, 70, 80, 90) is the part (50) of a telephone held in the hand, said telephone comprising a receiver circuit (51) to receive an information flow, a multiplexer (52) receiving information decoded by the receiver circuit (51) and switching information as a function of its nature to devices controlling means of converting the received information into analogue physical magnitudes, the telephone comprising a connection (55) between the multiplexer (521) and the tactile display control server.

12. Device according to claim 10, characterised in that said device (50, 60, 70, 80, 90) is an organiser (60), said organiser (60) comprising a receiver circuit (61) to receive positioning information for land or satellite beacons, a multiplexer (62) receiving information decoded by the receiver circuit (61) and switching information towards devices for controlling means of converting received information into analogue physical magnitudes as a function of its nature, the organiser (60) comprising a connection (65) between the multiplexer (62) and the tactile display control server.

13. Device according to claim 10, characterised in that said device (50, 60, 70, 80, 90) is a computer mouse (70), said mouse (70) comprising a receiver circuit (71) to receive positioning information of an index controlled by manoeuvres of said mouse (70), a multiplexer (72) receiving information decoded by the receiver circuit (71) and switching information towards devices for controlling means of converting received information into analogue physical magnitudes as a function of its nature, the mouse (70) comprising a connection between the multiplexer (72) and the tactile display control server.

14. Device according to claim 10, characterised in that said device (50, 60, 70, 80, 90) is a computer keyboard, said keyboard (80) comprising a receiver circuit to receive information from a system unit of the computer, a multiplexer receiving information decoded by the receiver circuit and switching information towards devices for controlling means of converting received information into analogue physical magnitudes as a function of its nature, the keyboard (80) comprising a connection between the multiplexer and the tactile display control server.

15. Device according to claim 10, characterised in that said device (50, 60, 70, 80, 90) is a vehicle steering wheel (90), said steering wheel (90) comprising a receiver circuit to receive information from sensors arranged onboard the vehicle, a multiplexer receiving information decoded by the receiver circuit and switching information towards devices for controlling means of converting received information into analogue physical magnitudes as a function of its nature, the steering wheel (90) comprising a connection between the multiplexer and the tactile display control server.

16. Device according to claim 15, characterised in that the touch plate (10) is in two parts, one at the right and one at the left side of the steering wheel (90).

17. Device according to claim 15, characterised in that the touch plate (10) comprises tactile pads (11) continuously distributed around at least part of the contour of the steering wheel (90).

* * * * *